United States Patent
Ojima (10) Patent No.: US 11,199,636 B2
(45) Date of Patent: Dec. 14, 2021

(54) SCINTILLATOR PLATE, RADIATION DETECTING APPARATUS, AND RADIATION DETECTING SYSTEM

(71) Applicant: CANON KABUSHIKI KAISHA, Tokyo (JP)

(72) Inventor: Tetsunori Ojima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 16/555,475

(22) Filed: Aug. 29, 2019

(65) Prior Publication Data

US 2020/0081140 A1 Mar. 12, 2020

(30) Foreign Application Priority Data

Sep. 6, 2018 (JP) .............................. JP2018-167214

(51) Int. Cl.
*G01T 1/202* (2006.01)

(52) U.S. Cl.
CPC .................................. *G01T 1/2023* (2013.01)

(58) Field of Classification Search
CPC .............................. G01T 1/2023; G01T 1/202
See application file for complete search history.

(56) References Cited

U.S. PATENT DOCUMENTS

| | | | |
|---|---|---|---|
| 5,241,180 A * | 8/1993 | Ishaque | G01T 1/202 250/361 R |
| 6,469,305 B2 | 10/2002 | Takabayashi et al. | |
| 7,126,130 B2 * | 10/2006 | Hennessy | G01T 1/2002 250/370.11 |
| 7,538,330 B2 | 5/2009 | Nomura et al. | |
| 7,893,405 B2 | 2/2011 | Nomura et al. | |
| 8,779,369 B2 | 7/2014 | Ichimura et al. | |
| 9,857,482 B2 | 1/2018 | Shigeta et al. | |
| 10,094,938 B2 | 10/2018 | Ojima et al. | |
| 10,302,776 B2 | 5/2019 | Toyama et al. | |
| 2004/0042585 A1 * | 3/2004 | Nagarkar | G21K 4/00 378/98.8 |
| 2012/0223240 A1 | 9/2012 | Ichimura et al. | |
| 2014/0138549 A1 * | 5/2014 | Huh | G01T 1/202 250/366 |

(Continued)

FOREIGN PATENT DOCUMENTS

| | | | |
|---|---|---|---|
| JP | 2000-9845 A | 1/2000 | |
| JP | 2008-051793 A | 3/2008 | |

(Continued)

OTHER PUBLICATIONS

Notification of Reasons for Refusal in Japanese Application No. 2018-167214 (dated Dec. 6, 2019).

(Continued)

*Primary Examiner* — Christine S. Kim
(74) *Attorney, Agent, or Firm* — Venable LLP (57) ABSTRACT

A scintillator plate is provided. The scintillator plate comprises a substrate, a scintillator including a plurality of columnar crystals arranged above the substrate, a first protective film, and a second protective film. The first protective film chemically bonds to the plurality of columnar crystals in interfaces with the plurality of columnar crystals, and the substrate and the second protective film seal the scintillator and the first protective film.

20 Claims, 4 Drawing Sheets

(56) References Cited

U.S. PATENT DOCUMENTS

| | | | | |
|---|---|---|---|---|
| 2015/0204985 A1* | 7/2015 | Jonishi | ................. | G01T 1/202 |
| | | | | 250/361 R |
| 2015/0338529 A1* | 11/2015 | Svenonius | ............ | G01T 1/2002 |
| | | | | 250/486.1 |
| 2018/0031713 A1* | 2/2018 | Ojima | .................. | G01T 1/202 |
| 2019/0041532 A1* | 2/2019 | Toyama | ................ | G01T 1/202 |
| 2019/0196029 A1* | 6/2019 | Ojima | ................. | G01T 1/2023 |

FOREIGN PATENT DOCUMENTS

| | | | | |
|---|---|---|---|---|
| JP | 2012-202784 A | 10/2012 | | |
| JP | 2015-121425 A | 7/2015 | | |
| JP | 2015-155799 A | 8/2015 | | |
| JP | 2017-110929 A | 6/2017 | | |
| JP | 2018-017612 A | 2/2018 | | |
| JP | 2018-036197 A | 3/2018 | | |
| JP | 2018-096792 A | 6/2018 | | |
| WO | 2016/006483 A1 | 1/2016 | | |
| WO | WO-2017104400 A1 * | 6/2017 | ............. | G01T 1/202 |
| WO | 2018/110061 A1 | 6/2018 | | |

OTHER PUBLICATIONS

Extended European Search Report in European Application No. 19191653.5 (dated Jan. 2020).

\* cited by examiner

SCINTILLATOR PLATE, RADIATION DETECTING APPARATUS, AND RADIATION DETECTING SYSTEM

BACKGROUND OF THE INVENTION

Field of the Invention

The present invention relates to a scintillator plate, a radiation detecting apparatus, and a radiation detecting system.

Description of the Related Art

A radiation detecting apparatus combining a scintillator plate including a scintillator for converting radiation into light and a photoelectric conversion element for detecting the light converted by the scintillator is widely used. To efficiently propagate light converted from radiation to the photoelectric conversion element, a scintillator having a columnar structure is used to propagate the light in a columnar crystal. An alkali halide such as CsI is used as the scintillator having a columnar structure, but an alkali halide is deliquescent. When exposed to the atmosphere, therefore, an alkali halide causes deliquescence and modification due to water vapor contained in the atmosphere. Japanese Patent Laid-Open No. 2000-9845 discloses a method of suppressing deliquescence by covering the scintillator with a poly-p-xylylene film.

SUMMARY OF THE INVENTION

When a thick poly-p-xylylene film is used as a protective film for protecting the scintillator from water vapor in the atmosphere as disclosed in Japanese Patent Laid-Open No. 2000-9845, the effect of suppressing deliquescence of the scintillator improves. On the other hand, if the protective film is thickened, light converted by the scintillator diffuses in the protective film, and this may decrease the spatial resolution of a radiation detecting apparatus. However, the effect of suppressing deliquescence of the scintillator decreases if the protective film using a poly-p-xylylene film is thinned.

Some embodiments of the present invention provide a technique advantageous in suppressing both deterioration of the characteristics of a scintillator and a decrease in spatial resolution.

According to some embodiments, a scintillator plate comprising a substrate, a scintillator including a plurality of columnar crystals arranged above the substrate, a first protective film, and a second protective film, wherein the first protective film chemically bonds to the plurality of columnar crystals in interfaces with the plurality of columnar crystals, and the substrate and the second protective film seal the scintillator and the first protective film, is provided.

Further features of the present invention will become apparent from the following description of exemplary embodiments with reference to the attached drawings.

DESCRIPTION OF THE EMBODIMENTS

A practical embodiment of a radiation imaging apparatus according to the present invention will be explained below with reference to the accompanying drawings. In the following explanation and drawings, common reference numerals denote components common to a plurality of drawings. Therefore, common components will be explained by referring to the plurality of drawings, and an explanation of components denoted by the common reference numerals will be omitted as needed. In addition, radiation in the present invention includes an α-ray, a β-ray, and a γ-ray each of which is a beam formed by particles (including photons) released by radioactive decay, and can also include beams having energy at an equivalent level or higher, such as an X-ray, a particle beam, and a cosmic ray.

Figure 1:
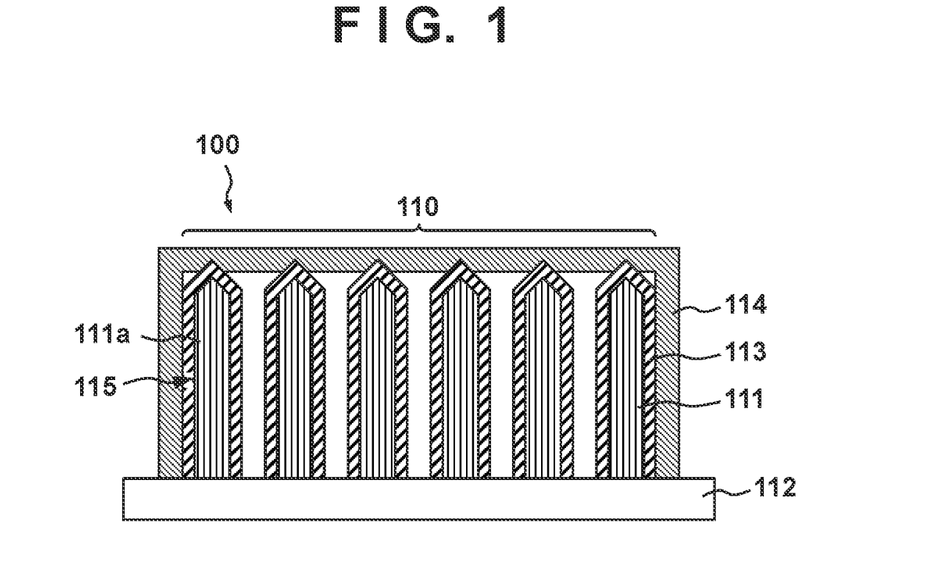
FIG. 1 is a sectional view showing a configuration example of a scintillator plate according to an embodiment of the present invention.

The arrangement of the scintillator plate according to the embodiment of the present invention will be explained with reference to FIGS. 1 to 3B. FIG. 1 is a sectional view showing a configuration example of a scintillator plate 100 according to this embodiment. The scintillator plate 100 includes a substrate 112, a scintillator 110 including a plurality of columnar crystals 111 arranged on the substrate 112, a protective film 113 (a first protective film), and a protective film 114 (a second protective film). Each component of the scintillator plate 100 of this embodiment will be explained in detail below, and a radiation detecting apparatus using the scintillator plate 100 will be explained later.

(Scintillator 110)

In this embodiment, the scintillator 110 is formed on the substrate 112. The scintillator 110 is formed by a plurality of crystals (the columnar crystals 111) having a columnar structure and projecting from the surface of the substrate 112, and emits light such as fluorescence or phosphorescence when exposed to radiation. That is, the scintillator 110 can be a fluorescent material or phosphorescent material that absorbs energy of incident radiation and emits light within a wavelength range of 300 nm to 800 nm, that is, emits light from ultraviolet light to infrared light around so-called visible light. The major axis of the columnar crystal 111 can perpendicularly intersect the substrate 112. However, the major axis of the columnar crystal 111 need not strictly be perpendicular to the substrate 112, and may also be inclined. Even when the angle between the major axis of the columnar crystal 111 and the surface of the substrate 112 is not strictly a right angle, the influence on the effect of this embodiment to be explained below is small.

Light emitted by each columnar crystal 111 of the scintillator 110 must be propagated through the columnar crystals 111 and guided to the light-receiving surface of a photoelectric conversion panel in which photoelectric conversion elements for generating a radiation image are arranged. Therefore, the angle between the major axis of each columnar crystal 111 of the scintillator 110 and a line perpendicular to the surface of the substrate 112 may also be 45° or less. In addition, the columnar crystals 111 need not uniformly be inclined to the surface of the substrate 112. Accordingly, the plurality of columnar crystals 111 forming the scintillator 110 may include many optical interfaces having angles of 45° or less to the line perpendicular to the surface of the substrate 112.

Each columnar crystal 111 of the scintillator 110 can have a columnar structure as described above. This columnar structure of the columnar crystal 111 can be either a circular column or a polygonal column. In addition, the columnar structures of the columnar crystals 111 need not be uniform, so the scintillator 110 may also include both circular columnar crystals and polygonal columnar crystals. Furthermore, the thicknesses of the columnar crystals 111 need not be uniform, so the scintillator 110 may also include columnar crystals different in thickness. The thickness of each columnar crystal 111 can be, for example, 0.1 µm (inclusive) to 50 µm (inclusive). The thickness of each columnar crystal 111 can also be 0.1 µm (inclusive) to 15 µm (inclusive). If the thickness of the columnar crystal 111 of the scintillator 110 is less than 0.1 µm, the thickness of the columnar crystal 111 is small compared to the wavelength of light generated in the columnar crystal 111 of the scintillator 110. Accordingly, geometrical light diffraction and optical scattering hardly occur, and this makes it difficult to guide the light toward the light-receiving surface. As a consequence, the light diffuses outside the columnar crystals 111, and this may decrease the spatial resolution of a radiation detector using the scintillator plate 100 like this. On the other hand, it is theoretically difficult for the scintillator plate 100 to resolve an object smaller than the thickness of each columnar crystal 111 of the scintillator 110. Therefore, if the thickness of each columnar crystal of the scintillator 110 is larger than 50 µm, the spatial resolution may decrease not only in a high-spatial-frequency region such as 10 LP/mm but also in a low-spatial-frequency region such as 1 LP/mm.

Furthermore, the thickness of each columnar crystal 111 of the scintillator 110 need not be uniform, and a change in thickness from one end to the other can be, for example, 50 µm or less. In this embodiment, however, the columnar crystal 111 includes a needle structure that is thick on the side of the substrate 112 and narrows in the direction away from the substrate 112. When the columnar crystal 111 of the scintillator 110 has the needle structure, the distal end of the columnar crystal 111 (that is, an end portion on a side opposite to the side in contact with the substrate 112) can be thinner by 50 µm or more than another portion of the columnar crystal 111, such as a portion in contact with the substrate 112. Also, the sectional shape of the columnar crystal 111 need not be uniform from one end to the other end. For example, a crystal that is a polygonal column in a portion at a short distance from the substrate 112 may change into a circular column as the distance from the substrate 112 increases.

The height of the scintillator 110 is the length of the major axis of each columnar crystal 111, and a smaller variation of the lengths of the columnar crystals 111 of the scintillator 110 is suitable. The lengths of the major axes of the columnar crystals 111 may also be uniform. However, these lengths need not always be uniform, and the scintillator 110 can include both long columnar crystals 111 and short columnar crystals 111. Even when light leaks out from the end of the short columnar crystal 111, the light may enter adjacent columnar crystals 111 and propagate toward the light-receiving surface through the columnar crystals 111 of the scintillator 110. Accordingly, even the scintillator 110 including both the long and short columnar crystals 111 can suppress light diffusion and hence has optical waveguide properties.

The length of the major axis of each columnar crystal 111 of the scintillator 110 has no large influence on the effect of this embodiment, so the effect of this embodiment can be achieved regardless of whether the columnar crystals 111 are long or short. Therefore, the length of the major axis of the scintillator 110 is not particularly limited, but can be 100 nm (inclusive) to 10 cm (inclusive) when a practical manufacturing process is taken into consideration. Furthermore, the length of the scintillator 110 can also be 1 µm (inclusive) to 1 cm (inclusive).

The columnar crystals 111 adjacent to each other in the scintillator 110 can have independent columnar structures having a spacing of 200 nm (inclusive) to 1 µm (inclusive) between their side surfaces. However, the columnar crystals need not completely be separated from each other, and optical interfaces can intermittently exist in the direction crossing the surface of the substrate 112 in the scintillator 110. The scintillator 110 can have optical waveguide properties even when optical interfaces intermittently exist. In addition, a plurality of air gaps or light scattering bodies can exist in the columnar crystal 111 of the scintillator 110. The air gaps or light scattering bodies scatter light, but the scattered light can enter adjacent columnar crystals 111 in the scintillator 110 and propagate toward the light-receiving surface. Accordingly, the scintillator 110 can have optical waveguide properties even when the columnar crystal 111 contains air gaps or scattering bodies. Also, the columnar crystal 111 of the scintillator 110 can have a conical distal end as shown in FIG. 1. The distal end of each columnar crystal 111 may also be flattened. When the distal end of the columnar crystal 111 is flattened, unevenness to the light-receiving surface becomes small, so the light-receiving surface of the photoelectric conversion panel can efficiently receive light.

Various well-known scintillator materials can be used as the material forming each columnar crystal 111 of the scintillator 110. In this embodiment, the scintillator 110 is covered with the protective films 113 and 114 and hardly influenced by water molecules, so a material that deteriorates when brought into contact with water molecules can be used as the scintillator 110. A practical example of the scintillator 110 is a deliquescent compound, particularly, a halide such as a metal halide. A metal halide causes deliquescence and changes its structure when exposed to the atmosphere. When deliquescence occurs and the structure changes, light propagating in the columnar crystals 111 of the scintillator 110 diffuses outside the columnar crystals 111, and this may decrease the spatial resolution of a radiation detector. Accordingly, this embodiment is applicable to the scintillator 110 using not only a deliquescent material but also a material that may deteriorate and decrease the spatial resolution of a radiation detector when brought into contact with water molecules.

The deliquescence reaction of the columnar crystal 111 of the scintillator 110 occurs due to a hydrolysis reaction caused when the columnar crystal 111 comes in contact with water, and the resultant water absorption caused by hydration of an aqueous solution of the scintillator material. As a method of suppressing this deliquescence reaction, there is a method of preventing contact between the scintillator 110 and water by covering a space in which the scintillator 110 exists with a layer having a low water vapor transmission rate. As another method of suppressing the deliquescence reaction, there is a method of substituting the surface of the columnar crystal 111 with other stable molecules so as to prevent the hydrolysis reaction of the columnar crystal 111 of the scintillator 110. When using this method in a space in which a large amount of water vapor exists, water molecules may be transmitted through the surface layer of the columnar crystal 111 substituted with stable molecules, and may hydrolyze the interior of the columnar crystal 111, thereby causing a deliquescence phenomenon. In this embodiment, the degradation of the characteristics of the scintillator 110 using the two protective films 113 and 114 is suppressed, as will be described later.

A typical material of the metal halide is an alkali halide such as cesium iodide (CsI). CsI has high efficiency of conversion from an X-ray as radiation into visible light. Also, CsI can easily form the scintillator 110 having the columnar crystals 111 by vapor deposition, and can increase the length of each columnar crystal 111 of the scintillator 110. An activator agent is added to CsI because CsI cannot achieve high light emission efficiency singly. It is possible to use, for example, indium (In), thallium (Tl), lithium (Li), potassium (K), rubidium (Rb), or sodium (Na), as the activator agent.

For example, the scintillator 110 can be formed by using CsI and an additive containing one or more types of Tl compounds, as raw materials for forming a CsI scintillator containing Tl. CsI:Tl has a wide light emission wavelength from 400 nm to 750 nm. As a Tl compound containing one or more types of Tl compounds, a monovalent or trivalent compound can be used. For example, it is possible to use thallium iodide (TlI), thallium bromide (TlBr), thallium chloride (TlCl), or thallium fluoride (TlF, TlF$_3$). The content of the activator agent can properly be adjusted in accordance with the objective performance, and can be, for example, 0.01 mol % (inclusive) to 20 mol % (inclusive) with respect to CsI.

An alkali halide represented by formula (1) below can be used as the alkali halide of the scintillator 110:

$$M1X1 \cdot \alpha M2X2 \cdot \beta M3X3 : \gamma A1 \tag{1}$$

In formula (1), M1 represents at least one type selected from the group consisting of lithium (Li), sodium (Na), potassium (K), rubidium (Rb), and cesium (Cs). M2 represents at least one type selected from the group consisting of beryllium (Be), magnesium (Mg), calcium (Ca), strontium (Sr), barium (Ba), zinc (Zn), cadmium (Cd), copper (Cu), and nickel (Ni). M3 represents at least one type selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), aluminum (Al), gallium (Ga), and indium (In). X1, X2, and X3 each independently represent at least one type selected from the group consisting of fluorine (F), chlorine (Cl), bromine (Br), and iodine (I). A1 represents at least one type selected from the group consisting of Eu, Tb, In, bismuth (Bi), Ce, Tm, Dy, Pr, Ho, Nd, Yb, Er, Gd, Lu, Sm, Y, thallium (Tl), Na, silver (Ag), Cu, and Mg. $\alpha, \beta$, and $\gamma$ represent numerical values within the ranges of $0 \leq \alpha < 0.5$, $0 \leq \beta < 0.5$, and $0 < \gamma \leq 0.2$.

In this embodiment, a compound other than the above-described halide compounds can also be used in the scintillator 110. Practical examples are an LnTaO$_4$:(Nb, Gd)-based compound, an Ln$_2$SiO$_5$:Ce-based compound, an LnO$_x$:Tm-based compound (Ln represents a rare-earth element), Gd$_2$O$_2$S:Tb, Gd$_2$O$_2$S:Pr, Ce, ZnWO$_4$, LuAlO$_3$:Ce, Gd$_3$Ga$_5$O$_{12}$:Cr, and HfO$_2$.

(Substrate 112)

In this embodiment, the substrate 112 can be a solid capable of holding the scintillator 110. As the substrate 112, it is possible to use a substrate made of a material such as a metal or its oxide, a semiconductor or its oxide, glass, or a resin, or a sensor panel obtained by forming, for example, a photoelectric conversion element for detecting light on any of these substrates. A material having a low water vapor transmission rate is suitable for the substrate 112. However, a material having a high water vapor transmission rate may also be used as the substrate 112. In this case, a layer using a material having a low water vapor transmission rate is formed on the obverse surface or reverse surface of the substrate 112.

(Protective Film 113)

As described above, deliquescence of the columnar crystal 111 of the scintillator 110 occurs in two stages, that is, the hydrolysis reaction between the columnar crystal 111 and water, and the hydration reaction of an aqueous solution of the scintillator material caused by the hydrolysis reaction. In this embodiment, the protective film 113 chemically bonds to each of the plurality of columnar crystals 111 in the interface of each of the plurality of columnar crystals 111, thereby making the hydrolysis reaction difficult to occur on the surface of the columnar crystal 111 of the scintillator 110. This is so because a chemical bond stable with respect to water is formed between the surface of each columnar crystal 111 of the scintillator 110 and the protective film 113, thereby causing almost no hydrolysis reaction on the surface of the columnar crystal 111. Consequently, no hydration reaction occurs either, so the columnar crystal 111 of the scintillator 110 can maintain the columnar structure. For example, when the columnar crystal 111 of the scintillator 110 is CsI, Cs or I and one of the elements forming the protective film 113 need only form a chemical bond stable with respect to water.

This chemical bond includes a covalent bond, an ionic bond, a coordinate bond, a hydrogen bond, and a metallic bond. The existence of the chemical bond can be confirmed by, for example, combining analysis by X-ray photoelectron spectroscopy (XPS) and analysis by time-of-flight secondary ion mass spectrometry (TOF-SIMS). Elements existing on the interface between the protective film 113 and the columnar crystal 111 can be confirmed by XPS. Also, it is sometimes possible to estimate the type of bond formed by the element. Bonded elements are also detected when using TOF-SIMS. That is, when a chemical bond is formed between the protective film 113 and the columnar crystal 111 of the scintillator 110, a molecular amount is detected in a state in which the elements forming the protective film 113 and the columnar crystal 111 are bonded. By combining these two analytical methods, it is possible to confirm whether a chemical bond is formed between the columnar crystal 111 of the scintillator 110 and the protective film 113. It is also possible to confirm the existence of a chemical bond between the columnar crystal 111 of the scintillator 110 and the protective film 113 by using Fourier transform infrared spectroscopy (FT-IR) in accordance with the type of the bond.

The higher the ratio of a chemical bond between the protective film 113 and the surface of each columnar crystal 111, the more the deliquescence of the columnar crystal 111 can be suppressed. The protective film 113 covers at least an end portion of the scintillator 110, which is opposite to the substrate 112. The protective film 113 can further cover an end portion of each of the plurality of columnar crystals 111, which is opposite to the substrate 112. An end portion herein mentioned can be a range of ⅕ of the length of the major axis of the columnar crystal 111 from the distal end of the columnar crystal 111, which is opposite to the substrate 112.

This end portion can also be a range of ¼, and can further be a range of ½, of the length of the major axis of the columnar crystal 111 from the distal end of the columnar crystal 111, which is opposite to the substrate 112. Also, a portion of 20% or more of the surfaces of the plurality of columnar crystals 111, which are not in contact with the substrate, can chemically bond to the protective film 113. Furthermore, a portion of 50% or more of the surfaces of the plurality of columnar crystals 111, which are not in contact with the substrate, can chemically bond to the protective film 113. In addition, the portion of the columnar crystal 111, which is in contact with the protective film 113, need not entirely form a chemical bond. Since the protective film 113 covers the columnar crystal 111, the possibility that the columnar crystal 111 comes in contact with water is suppressed.

As shown in FIG. 1, the whole surface of each columnar crystal 111 can be in contact with the protective film 113 or the substrate 112. Although not shown in FIG. 1, the protective film 113 may also be formed on the substrate 112 between the columnar crystals 111 adjacent to each other. In this case, the protective film 113 formed between the adjacent columnar crystals 111 can be in contact with the substrate 112, or an air gap can be formed between the substrate 112 and the protective film 113 without covering a portion of the columnar crystal 111, which is adjacent to the substrate 112, with the protective film 113. Also, a portion where adjacent columnar crystals 111 of the scintillator 110 are in contact with each other or close to each other need not be covered with the protective film 113. When the protective film 113 is formed on only the end portion of the columnar crystal 111, which is opposite to the substrate 112, by a spray method, the columnar crystal 111 can maintain the columnar structure without causing any deliquescence. In the vicinity of the substrate 112, however, the columnar crystal 111 causes deliquescence, and the spatial resolution of this scintillator plate decreases. Therefore, the protective film 113 can be so formed as to increase the surface coverage of the protective film 113 with respect to the columnar crystal 111 of the scintillator 110. For example, the protective film 113 and the substrate 112 can cover each columnar crystal 111 of the scintillator 110 without any gap, so that the columnar crystal 111 is not exposed to the open air. Each of the plurality of columnar crystals 111 also includes an outer-edge crystal 111a formed on the outer edge of the scintillator in orthographic projection to the surface of the substrate 112. The outer-edge crystal 111a is exposed to water in the atmosphere more easily than a portion of the columnar crystal 111, which is formed in a region near the center of the columnar crystal 110 and close to the substrate 112. Accordingly, a portion 115 of the outer-edge crystal 111a, which does not face any of the plurality of columnar crystals 111, can entirely be covered with the protective film 113.

A sufficient deliquescence suppressing effect can be obtained even when the film thickness of the protective film 113 is small. On the other hand, even when the film thickness of the protective film 113 is increased, the effect of suppressing deliquescence of the columnar crystal 111 sometimes remains almost the same. As a consequence, the spatial resolution of the scintillator plate 100 may decrease due to an increase in optical path length or dispersion of light. Therefore, the film thickness of the protective film 113 can be, for example, 200 nm or less. Furthermore, the film thickness of the protective film 113 can be 100 nm or less, or 50 nm or less. Also, as shown in FIG. 1, an air gap can be formed between the side surfaces, which are covered with the protective films 113, of adjacent columnar crystals 111 of the plurality of columnar crystals 111. When an air gap is formed between the columnar crystals 111 covered with the protective films 113, it is possible to suppress a leak of light propagating in the columnar crystal 111 to adjacent columnar crystals 111, and suppress a decrease in spatial resolution of the scintillator plate 100.

The protective film 113 must be stable with respect to water, oxygen, and the like. Accordingly, the protective film 113 can contain an oxide of at least one type of an element selected from the group consisting of silicon, titanium, aluminum, and zirconium. For example, the protective film 113 can be a metal oxide or a semimetal oxide such as silicon oxide, titanium oxide, aluminum oxide, or zirconium oxide. In the interface between the protective film 113 and the columnar crystal 111, the element (silicon, titanium, aluminum, or zirconium) of the above-described metal or semimetal can form a stable chemical bond with the element forming the columnar crystal 111 of the scintillator 110 via oxygen. When the scintillator 110 is formed by CsI and the protective film 113 is formed by silicon oxide, Cs and Si form a chemical bond via 0, and this makes it possible to stabilize the columnar crystal 111 of the scintillator 110. Thus, the surface of the columnar crystal 111 can be stabilized by forming a chemical bond between the protective film 113 and the columnar crystal 111 of the scintillator 110.

The protective film 113 may also be formed by using metal or semimetal alkoxide as a material. In this case, the metal or semimetal alkoxide of the protective film 113 may partially remain unreacted. That is, the protective film 113 may contain at least one type of an element selected from silicon, titanium, aluminum, and zirconium, and at least one type selected from the group consisting of a methoxy group, an ethoxy group, a propoxy group, an isopropoxy group, a butoxy group, and an acetoxy group, each of which is bonded to the above element. In this case, the volume of a monomer unit forming the protective film 113 may be small. When using a material in which the volume of the monomer unit is large, the coverage of the surface of the columnar crystal 111 cannot be increased, and a sufficient deliquescence suppressing effect cannot be obtained in some cases. Even when using metal or semimetal alkoxide as a material, a metal or a semimetal such as silicon, titanium, aluminum, or zirconium and the columnar crystal 111 can form a chemical bond via oxygen. As metal or semimetal alkoxide, it is also possible to use a derivative which is obtained by substituting a metal or a semimetal with a halogen such as chlorine, bromine, or iodine, an amino group, or its hydrogen atom, or to which acetylene is bonded.

The protective film 113 can be formed by bringing the columnar crystal 111 of the scintillator 110 into contact with the material of the protective film 113. The material of the protective film 113 must have an active group that forms a chemical bond with the columnar crystal 111 or its hydrolysate of the scintillator 110. As the active group, it is possible to use, for example, an alkoxy group, a halogen group, an acetoxy group, or a hydroxyl group, each of which is bonded to a metal or a semimetal. A chemical bond can be formed in the interface between the material of the protective film 113 and the columnar crystal 111 by bringing the active group into contact with the columnar crystal 111 of the scintillator 110, or by activating the active group by using heat, plasma, a chemical reaction, or the like. When using an active group that easily activates, a chemical bond can be formed in the interface between the protective film 113 and the columnar crystal 111, without using heat, plasma, a chemical reaction, or the like. If the rate of formation of a chemical bond of materials is too high when forming the protective film 113, a gap between adjacent columnar crystals 111 is sometimes filled before the surface of the columnar crystal 111 is covered. Therefore, the activation method using heat, plasma, a chemical reaction, or the like can be adjusted so that the formation rate of a chemical bond between the materials of the protective film 113 becomes an appropriate rate.

(Protective Film 114)

The protective film 114 will be explained below. In this embodiment, a film having a water vapor transmission rate lower than that of the protective film 113 is used as the protective film 114. The substrate 112 and the protective film 114 seal the scintillator 110 and the protective film 113 from the open air. This further prevents water molecules from coming into contact with the scintillator 110, and suppresses deliquescence of the scintillator 110.

As the film thickness of the protective film 114 increases, the water vapor transmission rate decreases, and the effect of suppressing deliquescence of the scintillator 110 increases. However, when the film thickness of the protective film 114 increases, the length of the optical path through which light converted from radiation by the scintillator 110 reaches the light-receiving surface of the photoelectric conversion panel in which the photoelectric conversion elements are arranged increases, so the spatial resolution of the scintillator plate 100 decreases. Therefore, it is necessary to thin the protective film 114 while maintaining the effect of suppressing deliquescence of the columnar crystal 111. The protective film 114 must be formed so as not to form any gap, and can have a film thickness of, for example, 1 μm or more. Accordingly, the film thickness of the protective film 114 is larger than that of the protective film 113.

In this embodiment, the scintillator plate 100 implements a high deliquescence suppressing effect and suppression of a decrease in spatial resolution of the thin protective films 113 and 114, by combining the protective film 113 that suppresses a hydrolysis reaction and the protective film 114 having a low water vapor transmission rate. When implementing the deliquescence suppressing effect obtained by the combination of the protective films 113 and 114 by using only the protective film 114, the protective film 114 having a larger thickness is necessary, and this decreases the spatial resolution of the scintillator plate. In this embodiment, the film thickness of the protective film 114 to be used in combination with the protective film 113 can be 10 μm or less, can also be 5 μm or less, and can further be 2 μm or less. A decrease in spatial resolution of the scintillator plate 100 can be suppressed by decreasing the thickness of the protective film 114.

As described above, the protective film 113 has the effect of suppressing deliquescence of the columnar crystal 111. When using the protective films 113 and 114 by combining them, therefore, the water vapor transmission rate of the protective film 114 can be higher than that when forming no protective film 113. The water vapor transmission rate of the protective film 114 can be 10 g/m$^2$·day or less at 40° C. 90% RH, although it varies depending on the effect of suppressing deliquescence of the columnar crystal 111 of the protective film 113. When using the protective film 114 singly without forming any protective film 113, the water vapor transmission rate must have a value smaller than, for example, 1 g/m$^2$·day (40° C. 90% RH), and as a consequence a thick protective film 114 is necessary. On the other hand, in this embodiment, the water vapor transmission rate of the protective film 114 can be 1 g/m$^2$·day (40° C. 90% RH) or more, and can also be 5 g/m$^2$·day (40° C. 90% RH) or more. Consequently, the scintillator plate 100 of this embodiment can achieve a high deliquescence suppressing ability and a high spatial resolution of the scintillator 110 by combining the protective films 113 and 114.

The coverage of the protective film 114 with respect to the surface of the protective film 113 can be low. If the coverage is increased with a film thickness required of the protective film 114, the protective film 114 fills the gap between adjacent columnar crystals 111 of the scintillator 110. A high spatial resolution is implemented when light converted from radiation by the scintillator 110 propagates in the columnar crystal 111 as it is repetitively reflected in the columnar crystal 111. A refractive index difference in the interface between the protective films 113 and 114 determines the ratio of light reflection. If the protective film 114 fills the gap between the columnar crystals 111, the diffractive index difference in the interface may decrease, and the reflectance decreases. Consequently, the spatial resolution of the scintillator plate 100 decreases. For example, the coverage of the protective film 114 with respect to the surface of the protective film 113 can be 50% or less. As shown in FIG. 1, the protective film 114 can be in contact with the protective film 113 at the distal end of the columnar crystal 111 covered with the protective film 113. The protective film 114 can also be in contact with the protective film 113 in the whole of a portion, which does not oppose any of the plurality of columnar crystals 111, of the outer-edge crystal 111a arranged on the outer edge of the scintillator 110. In addition, the film thickness of the protective film 114 in a portion formed on the end portion of the scintillator 110, which is opposite to the substrate 112, can be different from the film thickness in a portion formed along the outer edge of the scintillator 110. For example, when extracting light from the end portion of the scintillator 110, the protective film 114 covering this portion can suppress a decrease in spatial resolution more with a smaller thickness. Accordingly, the film thickness of the protective film 114 formed on the end portion of the scintillator 110, which is opposite to the substrate 112, can be smaller than that of the protective film 114 formed along the outer edge of the scintillator 110.

The protective film 114 must have a film thickness of about 1 μm, and hence may absorb light depending on the constituent material. On the other hand, light converted from radiation by the scintillator 110 must reach the light-receiving surface, on which the photoelectric conversion elements are arranged, without being attenuated. Therefore, a material having a high light transmittance in a visible region must be used as the protective film 114. More specifically, the light transmittance of the protective film 114 can be 70% or more.

The protective film 114 can contain at least one of poly-p-xylylene, polyvinylidene chloride, silicon oxide, and aluminum oxide. However, the present invention is not limited to these materials, and a material other than the above-described materials can be used as the protective film 114 as long as the material is transparent and has a low water vapor transmission rate.

Figure 2A:
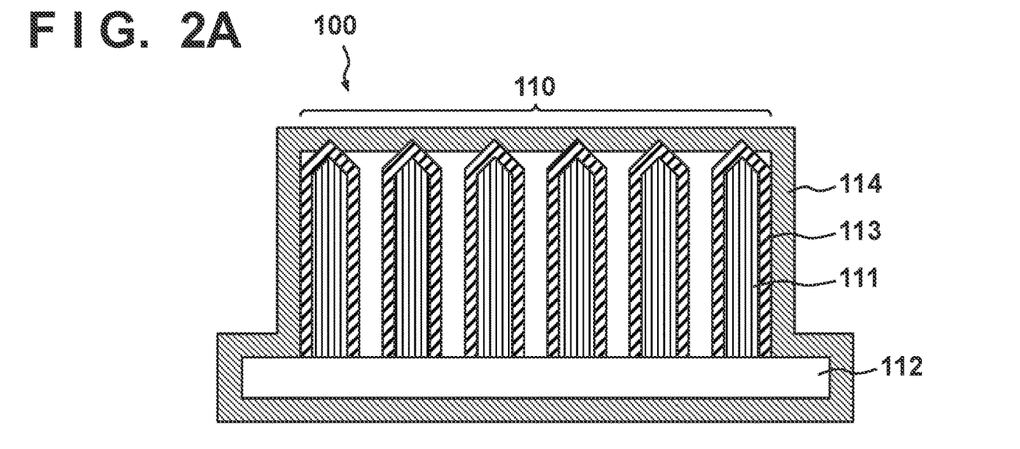
FIGS. 2A to 2C are sectional views showing modifications of the scintillator plate shown in FIG. 1.
Figure 2B:
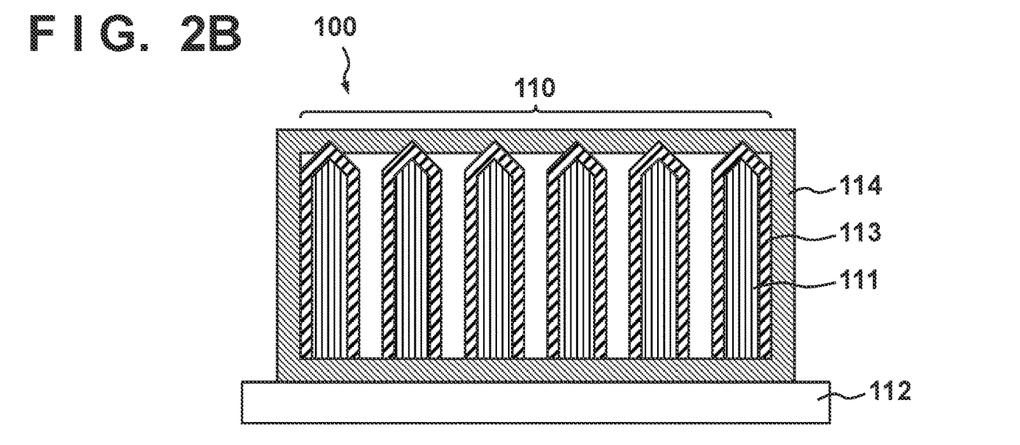
Figure 2C:
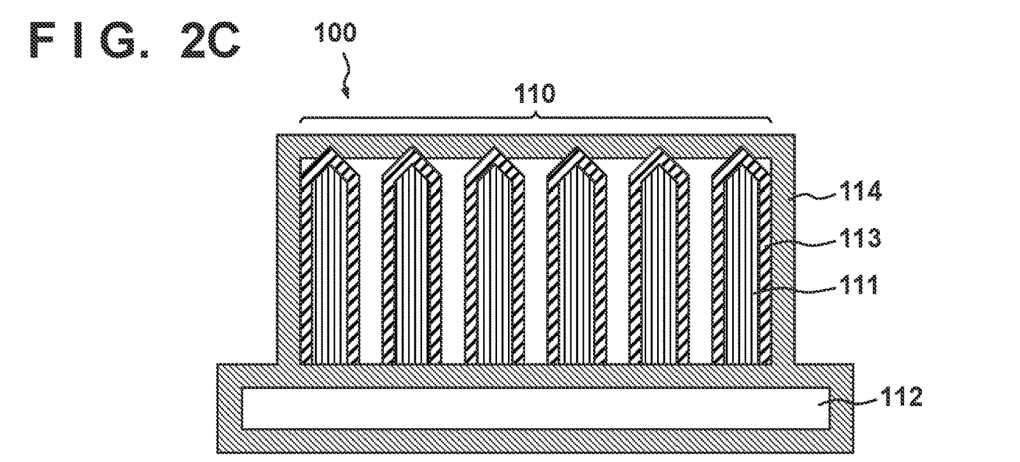

The position where the protective film 114 is formed will be explained below. As shown in FIG. 1, the protective film 114 can partially cover the substrate 112 so as to cover a portion of the substrate 112 where the scintillator 110 is formed. The protective film 114 is formed in contact with the protective film 113. Also, when the columnar crystal 111 (the outer-edge crystal 111a) formed on the outer edge of the scintillator is not covered with the protective film 113, the protective film 114 can also be in contact with the columnar crystal 111 of the scintillator 110. In addition, as shown in FIG. 1, when the surface of the substrate 112, which is opposite to the side on which the scintillator 110 is formed, is not covered with the protective film 114, the columnar crystal 111 of the scintillator 110 is in direct contact with the substrate 112. Therefore, the water vapor transmission rate at 40° C. 90% RH in the thickness direction of the substrate 112 can be less than 1 g/m²·day. Also, as shown in FIG. 2A, the protective film 114 can entirely cover a portion of the substrate 112, which is not covered with the scintillator 110 and the protective film 113. In this case, the water vapor transmission rate at 40° C. 90% RH of the substrate 112 can be 1 g/m²·day or more. In addition, as shown in FIG. 2B, the protective film 114 can cover the scintillator 110 and the protective film 113 covering each columnar crystal 111 of the scintillator 110. In other words, the scintillator plate 100 can further include a protective film (a third protective film) between the substrate 112 and the scintillator 110, and this protective film can include a film made of the same material as that of the protective film 114. For example, in a region of the substrate 112 where the scintillator 110 is to be formed, a portion of the protective film 114, which is positioned between the substrate 112 and the scintillator 110, is formed by using poly-p-xylylene or the like. Then, the scintillator 110 and the protective film 113 are formed. The protective film 114 shown in FIG. 2B can be formed by further forming the residual portion of the protective film 114 so as to cover the scintillator 110 and the protective film 113. Furthermore, as shown in FIG. 2C, the protective film 114 can surround the scintillator 110 and the protective film 113 covering each columnar crystal 111 of the scintillator 110, and can entirely cover a portion of the substrate 112, which is not covered with the scintillator 110 and the protective film 113. That is, the protective film 114 can have a portion that directly covers the scintillator 110, and can also have a portion that covers the scintillator 110 via the protective film 113.

As a method of forming the protective film 114, it is not possible to use a method, such as application of an aqueous solution, which destroys the columnar structure of the columnar crystal 111 of the scintillator 110, and a method that destroys the protective film 113. As a protective film formation method, it is possible to use, for example, chemical vapor deposition (CVD), physical vapor deposition (PVD), or application or spraying of a nonpolar solvent solution. It is also possible to use a method by which the protective film 114 formed into the shape of a sheet is adhered on the substrate 112 (and the protective film 113) so as to cover the scintillator 110 and the protective film 113.

Before the protective film 114 is formed after the formation of the scintillator 110, there is a possibility that the scintillator 110 comes in contact with water vapor in the atmosphere and deliquescence of the columnar crystal 111 occurs. In this embodiment, however, the protective film 113 is formed before the protective film 114 is formed. Accordingly, deliquescence of the columnar crystal 111 of the scintillator 110 can be suppressed by holding an appropriate temperature-humidity environment until the protective film 114 is formed after the formation of the scintillator 110.

(Radiation Detecting Apparatus 300)

Figure 3A:
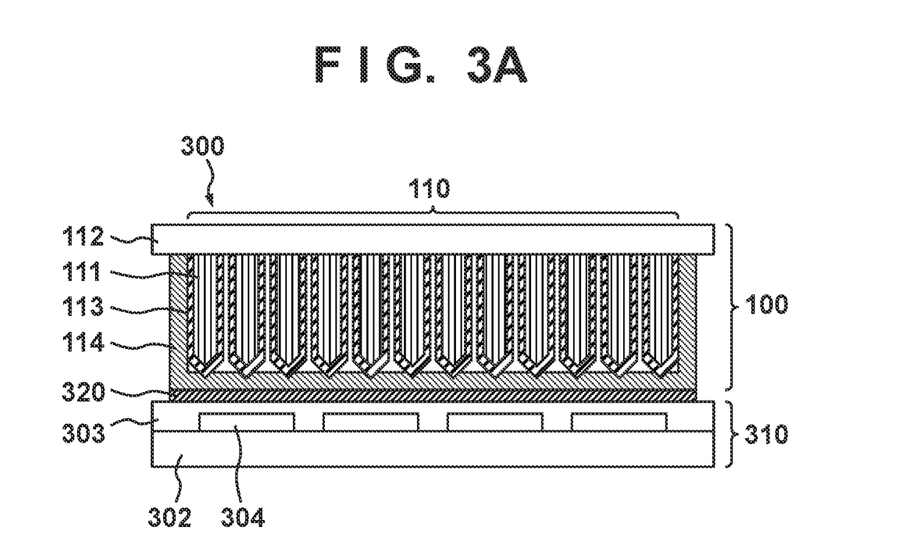
FIGS. 3A and 3B are sectional views showing configuration examples of a radiation detecting apparatus using the scintillator plate shown in FIG. 1.

Next, a radiation detecting apparatus 300 including the scintillator plate 100 of this embodiment will be explained. FIG. 3A is a sectional view of a radiation detecting apparatus 300 including the scintillator plate 100. The radiation detecting apparatus 300 includes the scintillator plate 100 described above, and a photoelectric conversion panel 310 on the light-receiving surface of which photoelectric conversion elements 304 for detecting light converted from radiation by the scintillator 110 are arranged. Referring to FIG. 3A, the substrate 112 shown in FIG. 1 of the scintillator plate 100 is exposed outside the radiation detecting apparatus 300. The scintillator plate 100 and the photoelectric conversion panel 310 can have a connecting portion 320 using an adhesive or the like. In addition to integrating the scintillator plate 100 and the photoelectric conversion panel 310, the connecting portion 320 may protect the scintillator plate 100, and may also protect the photoelectric conversion panel 310. The connecting portion 320 can also have a function of optically connecting the scintillator 110 and the light-receiving surface of the photoelectric conversion panel 310. In addition, the connecting portion 320 can have a multilayered structure in which two or more layers of different materials such as adhesives are stacked. Furthermore, on the surface of the substrate 112 on which the scintillator 110 is formed, a reflection layer that reflects light converted from radiation by the scintillator 110 or an absorption layer that absorbs the light can be formed.

The photoelectric conversion panel 310 includes a substrate 302 and a photoelectric conversion layer 303 formed on the substrate 302. The photoelectric conversion layer 303 includes a plurality of photoelectric conversion elements 304 for converting light into an electrical signal. The photoelectric conversion layer 303 can further include switching elements such as transistors and wiring patterns for extracting electrical signals from the photoelectric conversion elements 304. A glass substrate or the like is used as the substrate 302. A semiconductor layer such as a silicon layer is used as the photoelectric conversion layer 303. Furthermore, the substrate 302 and the photoelectric conversion layer 303 can also be integrated by forming the plurality of photoelectric conversion elements 304 on a silicon substrate.

Figure 3B:
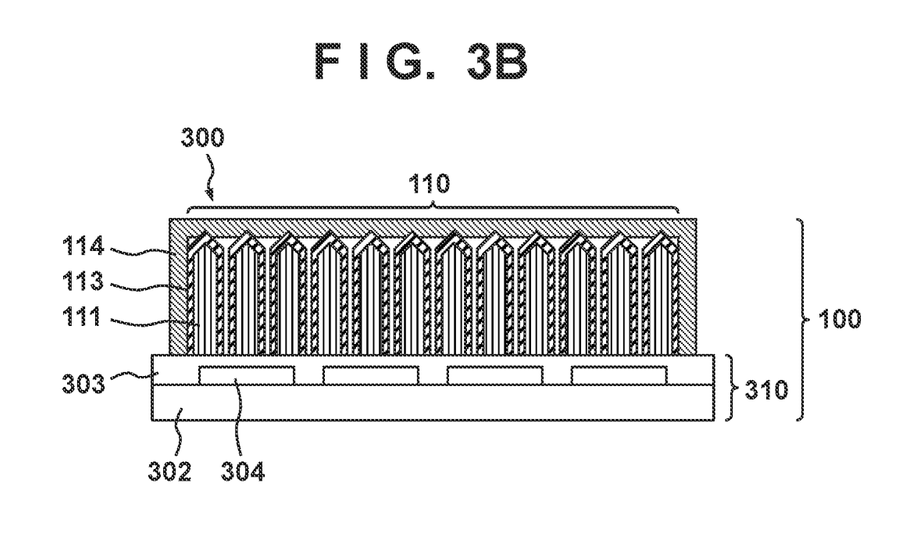

As shown in FIG. 3B, the radiation detecting apparatus 300 can also be implemented by using the photoelectric conversion panel 310 as the substrate 112 of the scintillator 110. In this case, a reflection layer for reflecting light converted from radiation by the scintillator 110 or an absorption layer for absorbing the light can be formed on a side of the protective film 114, which is opposite to the side of the scintillator 110.

EXAMPLE

An example of a method of manufacturing the scintillator plate 100 will be explained below. First, a glass substrate was used as the substrate 112. Then, the scintillator 110 was formed on the glass substrate by heating vapor deposition. A material powder of CsI was filled in a heating vessel in a vacuum chamber for forming the scintillator 110, and the glass substrate was placed on a turntable in a position opposite to the heating vessel. Also, a heating vessel different from the vessel filled with the CsI material powder was installed in the vacuum chamber, and filled with a material powder of TlI. After the heating vessels were filled with the material powders of CsI and TlI and the glass substrate was placed on the turntable, a high vacuum state was set in the vacuum chamber by a vacuum pump. Subsequently, CsI and TlI were simultaneously deposited on the glass substrate (substrate 112) by heating the heating vessels, thereby forming the scintillator 110 including the columnar crystals 111 on the substrate 112.

After the scintillator 110 was formed, the substrate 112 was taken out from the vacuum chamber, and ethyl silicate was rapidly brought into contact with the scintillator 110, thereby forming the protective film 113 on the scintillator 110. After the protective film 113 was formed, the substrate 112 was placed in a vacuum chamber for forming the protective film 114. Then, radical p-xylylene activated by heating di-p-xylylene was introduced into the vacuum chamber, thereby forming a poly-p-xylene film as the protective film 114. Thus, the scintillator plate 100 described above was obtained.

Figure 4:
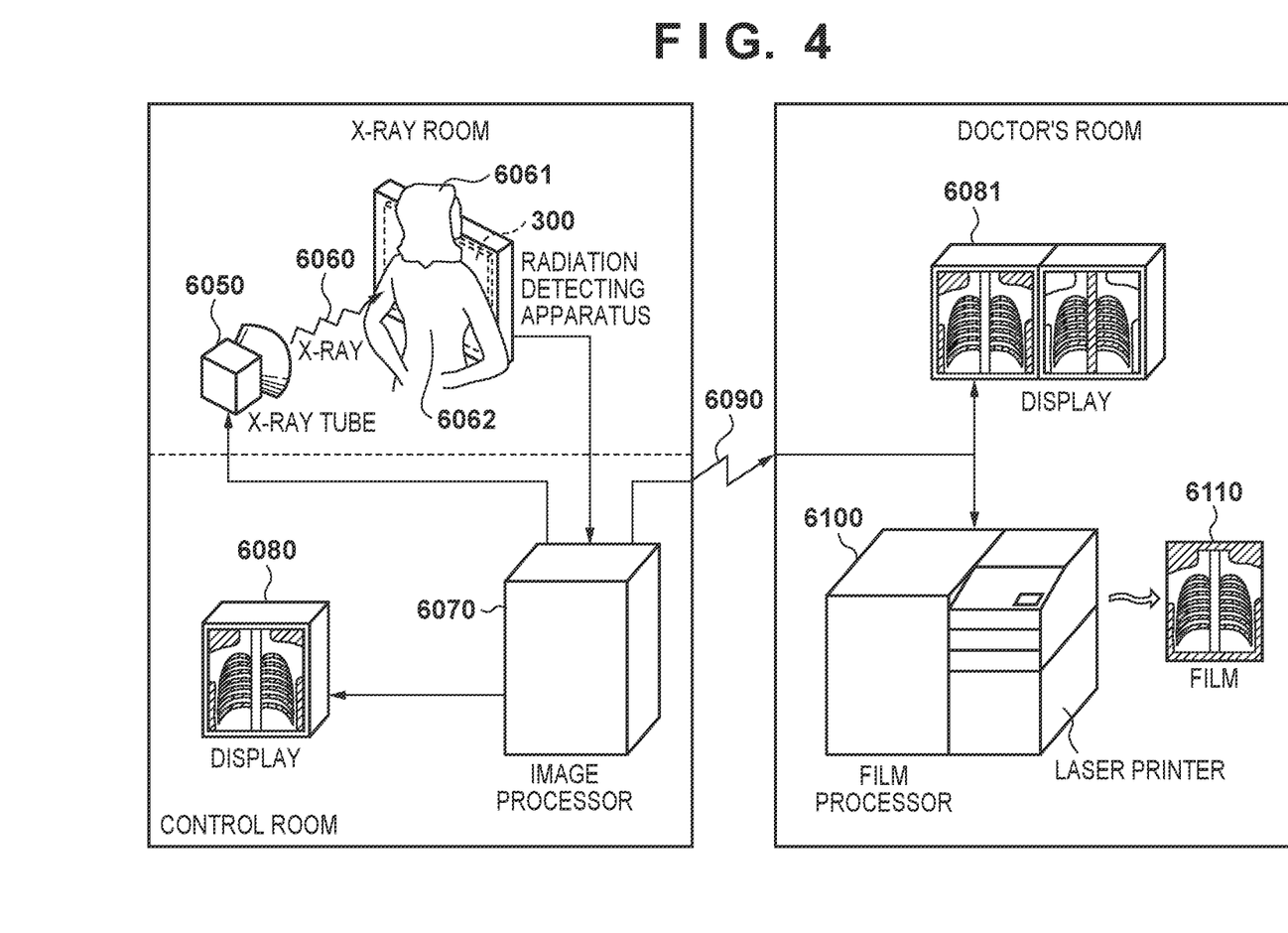
FIG. 4 is a view showing a configuration example of a radiation detecting system using the radiation detecting apparatus shown in FIGS. 3A and 3B.

A radiation detecting system incorporating the radiation detecting apparatus 300 using the above-described scintillator plate 100 will exemplarily be explained below with reference to FIG. 4. An X-ray 6060 generated by an X-ray tube 6050 as a radiation source for emitting radiation to the radiation detecting apparatus 300 enters the radiation detecting apparatus 300 through a chest 6062 of a patient or subject 6061. This incident X-ray contains information of the interior of the body of the patient or subject 6061. In the radiation detecting apparatus 300, the scintillator 110 emits light in response to the incidence of the X-ray 6060, and the photoelectric conversion elements 304 photoelectrically convert the light, thereby obtaining electrical information. This information is converted into digital data, and an image processor 6070 that functions as a signal processor for processing signals from the radiation detecting apparatus 300 performs image processing on the digital data. The processed data can be observed on a display 6080 as a display unit of a control room.

This information can also be transmitted to a remote place by a transmission processor such as a network 6090, for example, a telephone, a LAN, or the Internet. Consequently, the information can be displayed on a display 6081 as a display unit of a doctor room or the like in another place, so a doctor in the remote place can make a diagnosis. In addition, this information can be recorded on a recording medium such as an optical disk, and can also be recorded on a film 6110 as a recording medium by a film processor 6100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167214, filed Sep. 6, 2018 which is hereby incorporated by reference herein in its entirety.

What is claimed is:

1. A scintillator plate comprising a substrate, a scintillator including a plurality of columnar crystals arranged above the substrate, a first protective film, and a second protective film,
   wherein the first protective film chemically bonds to the plurality of columnar crystals in interfaces with the plurality of columnar crystals,
   wherein the second protective film has a lower water vapor transmission rate than that of the first protective film,
   wherein a film thickness of the second protective film is larger than that of the first protective film, and
   wherein the substrate and the second protective film seal the scintillator and the first protective film.

2. The scintillator plate according to claim 1,
   wherein a chemical bond in the interfaces between the first protective film and the plurality of columnar crystals is stable with respect to water, and includes at least one of a covalent bond, an ionic bond, a coordinate bond, a hydrogen bond, and a metallic bond.

3. The scintillator plate according to claim 1, wherein the first protective film contains an oxide of at least one element selected from the group consisting of silicon, titanium, aluminum, and zirconium.

4. The scintillator plate according to claim 3, wherein the at least one element chemically bonds to the plurality of columnar crystals via oxygen in the interfaces between the first protective film and the plurality of columnar crystals.

5. The scintillator plate according to claim 3, wherein the first protective film further contains at least one selected from the group consisting of a methoxy group, an ethoxy group, a propoxy group, an isopropoxy group, a butoxy group, an acetoxy group, chlorine, bromine, and iodine, each of which is bonded to the element.

6. The scintillator plate according to claim 1, wherein the first protective film covers at least an end portion of the scintillator, which is opposite to the substrate, and is arranged between the scintillator and the second protective film,
   wherein the second protective film covers the first protective film and the scintillator, and
   wherein a portion of not less than 20% of surfaces, which are not in contact with the substrate, of the plurality of columnar crystals is chemically bonded to the first protective film.

7. The scintillator plate according to claim 1, wherein the plurality of columnar crystals include an outer-edge crystal formed on an outer edge of the scintillator in an orthographic projection to the surface of the substrate, and
   wherein the first protective film entirely covers a portion of the outer-edge crystal, which does not face any of the plurality of columnar crystals.

8. The scintillator plate according to claim 1, wherein a film thickness of the first protective film is not more than 100 nm.

9. The scintillator plate according to claim 1, wherein an air gap is formed between side surfaces of adjacent columnar crystals, which are covered with the first protective film, of the plurality of columnar crystals.

10. The scintillator plate according to claim 1, wherein a water vapor transmission rate at 40° C. 90% RH of the second protective film is 1 $g/m^2 \cdot day$ (inclusive) to 10 $g/m^2 \cdot day$ (inclusive).

11. The scintillator plate according to claim 1, wherein the second protective film contains at least one of poly-p-xylylene, polyvinylidene chloride, silicon oxide, and aluminum oxide.

12. The scintillator plate according to claim 1, further comprising a third protective film between the substrate and the scintillator,
   wherein the third protective film includes a film made of the same material as that of the second protective film.

13. The scintillator plate according to claim 1, wherein the second protective film entirely covers a portion of the substrate, which is not covered with the scintillator and the first protective film.

14. The scintillator plate according to claim 1, wherein a spacing between side surfaces of adjacent columnar crystals of the plurality of columnar crystals is 200 nm (inclusive) to 1 μm (inclusive).

15. The scintillator plate according to claim 1, wherein a thickness of each of the plurality of columnar crystals is 0.1 μm (inclusive) to 50 μm (inclusive).

16. The scintillator plate according to claim 1, wherein the plurality of columnar crystals contain a halide compound.

17. The scintillator plate according to claim 16, wherein the halide compound includes an alkali halide.

18. The scintillator plate according to claim 17, wherein the alkali halide is represented by formula (1):

$$M1X1 \cdot \alpha M2X2 \cdot \beta M3X3 : \gamma A1 \tag{1},$$

where M1 represents at least one selected from the group consisting of lithium (Li), sodium (Na), potassium (K), rubidium (Rb), and cesium (Cs), where M2 represents at least one selected from the group consisting of beryllium (Be), magnesium (Mg), calcium (Ca), strontium (Sr), barium (Ba), zinc (Zn), cadmium (Cd), copper (Cu), and nickel (Ni), where M3 represents at least one selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), aluminum (Al), gallium (Ga), and indium (In), where X1, X2, and X3 each independently represents at least one selected from the group consisting of fluorine (F), chlorine (Cl), bromine (Br), and iodine (I), where Al represents at least one selected from the group consisting of Eu, Tb, In, bismuth (Bi), Ce, Tm, Dy, Pr, Ho, Nd, Yb, Er, Gd, Lu, Sm, Y, thallium (Tl), Na, silver (Ag), Cu, and Mg, and where $\alpha, \beta$, and $\gamma$ represent $0 \leq \alpha < 0.5$, $0 \leq \beta < 0.5$, and $0 < \gamma \leq 0.2$.

19. A radiation detecting apparatus comprising:

a scintillator plate according to claim 1; and a photoelectric conversion element configured to detect light converted from radiation by the scintillator.

20. A radiation detecting system comprising:

a radiation detecting apparatus according to claim 19; and a signal processing unit configured to process a signal from the radiation detecting apparatus.

\* \* \* \* \*